(12) United States Patent
Hanan (10) Patent No.: US 11,220,574 B1
(45) Date of Patent: Jan. 11, 2022

(54) METHOD OF FABRICATING A PLURALITY OF POLYETHYLENE TEREPHTHALATE NANOFIBERS

(71) Applicant: Niagara Bottling, LLC, Ontario, CA (US)

(72) Inventor: Jay Clarke Hanan, Ontario, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 709 days.

(21) Appl. No.: 14/876,701

(22) Filed: Oct. 6, 2015

Related U.S. Application Data (60) Provisional application No. 62/060,476, filed on Oct. 6, 2014.

(51) Int. Cl.
| | |
|---|---|
| *D01D 5/088* | (2006.01) |
| *D01D 5/18* | (2006.01) |
| *D01F 6/62* | (2006.01) |
| *C08G 63/183* | (2006.01) |
| *D01D 5/08* | (2006.01) |
| *B29K 105/26* | (2006.01) |

(52) U.S. Cl.
CPC ............ *C08G 63/183* (2013.01); *D01D 5/08* (2013.01); *B29K 2105/26* (2013.01); *D10B 2331/04* (2013.01)

(58) Field of Classification Search
CPC .......... D01D 5/08; D01D 5/18; D01D 5/0023; D01D 5/0076; D01D 7/00; D01D 5/088; D01F 6/62; B29K 2105/26; D10B 2331/04

USPC ............ 264/8, 211.1, 310, 311, 211.12, 465, 264/211.14, 911
See application file for complete search history.

(56) References Cited

U.S. PATENT DOCUMENTS

| 10,526,749 B2 | 1/2020 | Milton et al. | |
|---|---|---|---|
| 2003/0059491 A1* | 3/2003 | Konishi | D01D 5/18 264/8 X |
| 2008/0150185 A1* | 6/2008 | Topolkaraev | D04H 1/492 264/109 |
| 2014/0035177 A1* | 2/2014 | Lipton | D01D 5/18 264/8 |
| 2014/0086971 A1* | 3/2014 | Hall | D01D 7/00 424/422 |
| 2014/0350151 A1* | 11/2014 | Koslow | D01D 5/18 524/173 |

(Continued)

OTHER PUBLICATIONS

U.S. Appl. No. 16/000,769, filed Jun. 5, 2018.

(Continued)

*Primary Examiner* — Leo B Tentoni
(74) *Attorney, Agent, or Firm* — Michael Best & Friedrich LLP (57) ABSTRACT

A method of fabricating a plurality of polyethylene terephthalate (PET) nanofibers comprising enhanced thermal and structural properties is provided. The method includes providing a spinning apparatus comprising a plurality of orifices for extruding a polymeric resin material therethrough. At least a portion of the plurality of orifices have at least one feature of a radial arrangement, a recessed portion, and a distinctive size in relation to a remaining portion of the plurality of orifices. Extruding the polymeric resin material through the plurality of orifices by way of the spinning apparatus produces the plurality of PET nanofibers having enhanced thermal and structural properties.

8 Claims, 7 Drawing Sheets

(56) References Cited

U.S. PATENT DOCUMENTS

2015/0211149 A1* 7/2015 Lamanac ................ D01D 5/18
264/8

OTHER PUBLICATIONS

Dunson, Debra "Characterization of Polymers Using Dynamic Mechanical Analysis (OMA)", 2017, website: https://www.eag.com/wp-content/uploads/2017/09/M-022717-Characterization-of-Polymers-using-Dynamic-Mechanical-Analysis.pdf, obtained.
Paszkiewicz, et al.,"Morphology and Thermal Properties of Expanded Graphite (EG)/ Poly(ethylene terephthalate) (PET) Nanocomposites", CHEMIK, Jan. 2012, vol. 66, (pp. 26-30).
Final Office Action issued from the United States Patent Office for related U.S. Appl. No. 16/000,769, dated Jul. 21, 2021 (13 Pages).

* cited by examiner

METHOD OF FABRICATING A PLURALITY OF POLYETHYLENE TEREPHTHALATE NANOFIBERS

PRIORITY

This application claims the benefit of and priority to U.S. Provisional Application, entitled "Enhanced Thermal and Structural Performance Microfiber, Nanofiber, Articles, and Methods," filed on Oct. 6, 2014 having application Ser. No. 62/060,476.

FIELD

The field of the present disclosure generally relates to textiles. More particularly, the field of the present disclosure relates to microfibers and nanofibers for textiles and methods. Even more particularly, the present disclosure relates to high performance microfibers and nanofibers for textiles and methods.

BACKGROUND

Various methods have been implemented for the manufacture of synthetic fibers. One such method involves the manufacture of a synthetic material so as to simulate characteristics of natural goose down. This method involves increasing loft by reducing static friction to under 0.12. The synthetic material involves polyolefins, polyamides, acrylic fibers, and polyesters, with polyethylene terephthalate (PET) having an inherent viscosity (IV) of 0.62 IV. The resulting synthetic material does not expand after compression nor does it drape or bulk well.

Several related art products and processes involve the use of electro-dispersion for flocking fibers. For instance, one method for manufacturing balls of fibers involves drawing material through a tight space, welding, cleaving, and allowing the fiber balls to spring back. Further, the fibers are pre-crimped while they are being formed into a ball, wherein the fibers are pre-crimped by three to fifteen crimps per inch with mutually deviating phases. A silicon compound, such as dimethyl polysiloxane or a modified siloxane, is used to reduce static friction. The method further involves forming a U-shaped fiber with a 0.65 IV value and a 0.75% silicon coating.

Another related art product and process involves a filling material formed by way of crimped fibers joined together at one end and having crimps located in mutually deviating phases, while the other end of the fiber is free. The recovery force or resiliency of the crimps, located in the mutually deviating phases, causes the fibers to spread apart allowing air to enter between the fibers.

Yet another method involves using conductive heat-transfer in low density materials having thermal properties similar to air, such that the thermal properties are governed by radiative and convective heat transfer. Another related art product involves a synthetic down-replacement material which has a blend of 80 weight percent to 95 weight percent of a synthetic, spun, drawn, crimped, staple, polyester microfiber having a diameter of 3 microns to 12 microns. The polyester microfiber has a 5 weight percent to 20 weight percent synthetic, thermoplastic, staple, macrofiber having a diameter of greater than 12 microns to 50 microns.

A further related art product involves microfiber microwebs that have relatively dense nuclei with individual fibers and/or fiber bundles protruding therefrom. The microfiber microwebs may be incorporated into nonwoven webs of blown microfibers, air-laid staple fibers, or wood pulp fibers, as well as incorporated into shaped articles having porous covering materials. The microfiber microwebs are useful in sorbent, filtration, and thermal insulation materials. The microfiber microwebs are prepared by divellicating a microfiber web to form discrete particles of microfiber microwebs.

Another related art product involves a synthetic fiber thermal insulator material in the form of a cohesive fiber structure having between 70 weight percent and 95 weight percent synthetic polymeric microfibers with a diameter of between 3 microns and 12 microns and 5 weight percent to 30 weight percent synthetic polymeric macrofibers with a diameter of 12 microns to 50 microns. Some of the fibers are bonded at their contact points, such that the density of the resultant structure is within a range of 3 kg/m$^3$ to 16 kg/m$^3$. The thermal insulating properties of the bonded assemblage generally are equal to, or not substantially less than, the thermal insulating properties of a comparable un-bonded assemblage.

Still another related art product involves an aggregate of spherical fibers, particularly for use as filling material for blankets, such as quilts, pillows or the like. The spherical fibers and/or threads that are wrapped spherically and essentially form a fibrous ball. The fibrous balls contain a mixture of fibers, wherein one type of fiber has a higher modulus of elasticity compared to other type of fiber. Further, the fibers with the higher modulus of elasticity have a taper. Still another related art product involves fiber balls for filling pillows, cushions, and other similar support purposes by way of blends of slickened fiberfill of regular denier, so as to provide support and resilience, coupled with minor amounts of lower denier slickened fibers to provide optimal aesthetics.

While these related art products and methods involve several fiberfill uses, the products and methods are limited in their functionality and fail to provide high thermal performance and high loft.

SUMMARY

A method is provided for fabricating a plurality of nanofibers comprising enhanced thermal and structural properties is provided. The method includes providing a spinning apparatus comprising a plurality of orifices for extruding a polymeric resin material therethrough. At least a portion of the plurality of orifices have at least one feature of a radial arrangement, a recessed portion, and a distinctive size in relation to a remaining portion of the plurality of orifices. Extruding the polymeric resin material through the plurality of orifices by way of the spinning apparatus produces the plurality of nanofibers having enhanced thermal and structural properties.

In an exemplary embodiment, a method of fabricating a plurality of polyethylene terephthalate (PET) nanofibers having enhanced thermal and structural properties comprises providing an extruding and spinning apparatus, the extruding and spinning apparatus comprising a plurality of orifices, at least a portion of the plurality of orifices having at least one feature of a radial arrangement, a recessed portion, and a distinctive size in relation to a remaining portion of the plurality of orifices; and extruding and spinning a polymeric resin material through the plurality of orifices by way of the extruding and spinning apparatus.

In another exemplary embodiment, the method further comprises controlling a temperature of the polymeric resin material during extruding and spinning. In another exemplary embodiment, the method further comprises controlling a rotation speed of the extruding and spinning apparatus during extruding and spinning. In another exemplary embodiment, extruding and spinning comprises providing an effective centripetal acceleration to the polymeric resin material that increases as a function of radial distance from a center of the extruding and spinning apparatus, thereby forming the portion of the plurality of fibers having a smaller cross-section in relation to the remaining portion of the plurality of fibers.

In another exemplary embodiment, the plurality of orifices have a diameter ranging between substantially 20 gauge and substantially 30 gauge. In another exemplary embodiment, the portion of the plurality of orifices have a first diameter and the remaining portion of the plurality of orifices have a second diameter, the first diameter being configured to form nanofibers having a cross-sectional size of approximately 12 microns, and the second diameter being configured to form nanofibers having a cross-sectional size ranging between substantially 0.5 microns and substantially 7 microns.

In an exemplary embodiment, a product comprising a plurality of polyethylene terephthalate (PET) nanofibers is formed by a process comprising providing an extruding and spinning apparatus, the extruding and spinning apparatus comprising a plurality of orifices, at least a portion of the plurality of orifices having at least one feature of a radial arrangement, a recessed portion, and a distinctive size in relation to a remaining portion of the plurality if orifices; and extruding and spinning a polymeric resin material through plurality of orifices by way of the extruding and spinning apparatus.

In another exemplary embodiment, the plurality of orifices have a size ranging between substantially 20 gauge and substantially 30 gauge. In another exemplary embodiment, a portion of the plurality of orifices has a first size and a remaining portion of the plurality of orifices have a second size, the first and second sizes configured to form nanofiber mats comprising a mixture of fibers having different cross-sectional diameters. In another exemplary embodiment, for every 4 of the plurality of orifices that comprises the first size, 10 of the remaining portion of the plurality of orifices comprises the second size. In another exemplary embodiment, the first size is larger than the second size. In another exemplary embodiment, the first size is configured to form fibers having a diameter of approximately 12 microns, and the second size is configured to form fibers having a diameter ranging between substantially 0.5 microns and substantially 7 microns. In another exemplary embodiment, a portion of the plurality of orifices comprises a recess configured to form fibers having a first diameter and a remaining portion of the plurality of orifices are configured to form fibers having a second diameter, the first diameter being larger than the second diameter.

In an exemplary embodiment, a polyethylene terephthalate (PET) nanofiber comprises a polymeric resin material formed into an elongate shape having a cross-sectional size ranging between approximately 1 nanometer to approximately 12 microns. In another exemplary embodiment, the polymeric resin material comprises a recycled PET. In another exemplary embodiment, the polymeric resin material comprises a material that is not otherwise conducive for use in manufacturing of PET bottles.

In an exemplary embodiment, a nanofiber product comprises a plurality nanofibers having a plurality of cross-sectional sizes for simulating natural down. In another exemplary embodiment, at least a portion of the plurality of nanofibers have a first range of cross-sectional sizes configured to impart supportive properties to the nanofiber product, and a remaining portion of the plurality of nanofibers have a second range of cross-sectional sizes configured to impart a feather behavior to the nanofiber product. In another exemplary embodiment, the second range of cross-sectional sizes are configured to inhibit air movement among the plurality of nanofibers so as to minimize thermal conductivity of the nanofiber product.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first nanofiber," may be made. However, the specific numeric reference should not be interpreted as a literal sequential order but rather interpreted that the "first nanofiber" is different than a "second nanofiber." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, a method is provided for fabricating a plurality of polyethylene terephthalate (PET) nanofibers comprising enhanced thermal and structural properties. The method includes providing a spinning apparatus comprising a plurality of orifices for extruding a polymeric resin material therethrough. At least a portion of the plurality of orifices have at least one feature of a radial arrangement, a recessed portion, and a distinctive size in relation to a remaining portion of the plurality of orifices. Extruding the polymeric resin material through the plurality of orifices by way of the spinning apparatus produces the plurality of PET nanofibers having enhanced thermal and structural properties.

In addressing the problems experienced in the related art, the present disclosure generally involves a PET fiber, such as a microfiber or a nanofiber, that is cost-effectively manufactured by spinning a green technology precursor material through an opening having a single orifice size for forming the PET nanofiber, having a diameter of approximately 2 microns or less, whereby thermal performance is improved over related art macro fibers.

Generally, enhanced thermal performance microfiber and nanofiber articles involve a precursor material comprising a recycled PET that is adapted to spin through an opening having a single orifice size, such as by way of a spinneret. The recycled PET may comprise a material that is not otherwise conducive for use in manufacturing of PET bottles. In addition, the enhanced thermal performance microfiber and nanofiber articles may comprise improvements in loft over related art fibers, the microfiber and nanofiber articles having a plurality of cross-sectional sizes, so as to simulate a natural down material, such as goose down. Further, the fabrication methods of the present disclosure generally involve enhancing loft by forgoing running a strong pulling-draft while spinning the fibers; determining a thickness of an insulation layer while spinning the fibers by way of an air-flow technique; and optionally post processing of the fibers (or a web of fibers), such as by way of a web-handling technique.

Preferably, the microfibers and nanofibers comprise a plurality of cross-sectional sizes, such as multiple fiber diameters so as to enhance thermal insulation. In the presently disclosed fabrication methods, vital steps comprise: configuring a plurality of orifices on a spinneret for strategically disposing a plurality of fibers; extruding and spinning a polymeric resin material through orifices having at least two orifice sizes for forming the plurality of fibers by way of the spinneret; controlling a temperature of the polymeric resin material during extruding and spinning; and controlling a rotation speed of the spinneret during extruding and spinning, whereby enhanced microfibers and nanofibers are produced. The step of configuring the plurality of orifices on the spinneret comprises radially disposing at least one orifice away from a center of the spinneret for forming a smaller fiber, such as a nanofiber, by way of an effective centripetal acceleration being incident on the polymeric resin material during the extruding and spinning step, wherein the effective centripetal acceleration increases as a function of radial distance from the spinneret center, whereby fibers formed through orifices disposed away from the spinneret center are smaller in relation to fibers formed though orifices disposed closer to the spinneret center.

Figure 1:
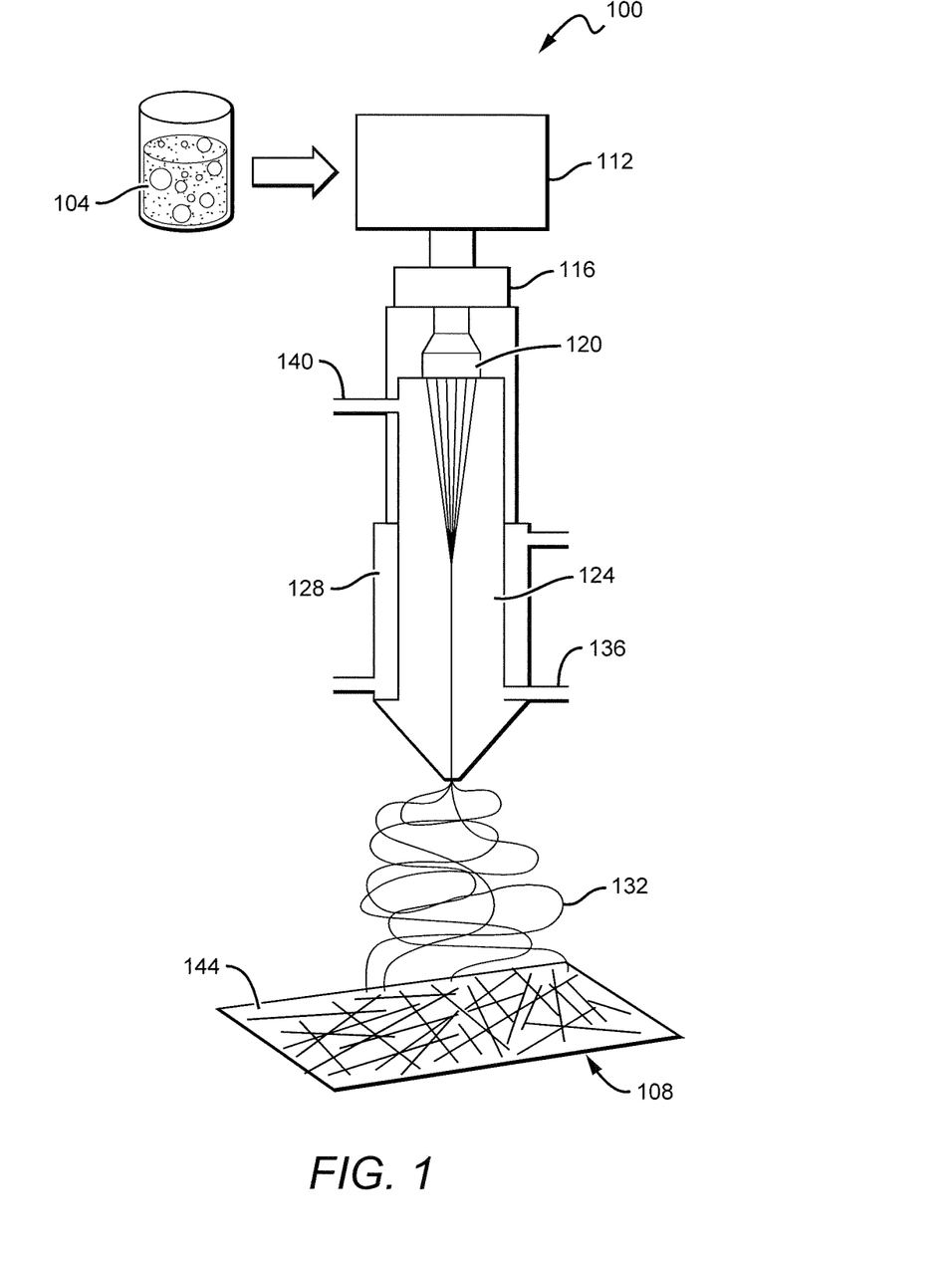
FIG. 1 is a schematic diagram illustrating an exemplary embodiment of a force-spinning system for fabricating nanofibers according to the present disclosure.

FIG. 1 is a schematic diagram illustrating an exemplary embodiment of a force-spinning system 100 that utilizes a precursor material 104 to fabricate a PET nanofiber mat 108 according to the present disclosure. The precursor material 104 is used to create a polymer solution 112, or melt, that serves as a source material for the force-spinning system 100. Preferably, the precursor material 104 comprises a recycled PET that is adapted to spin through an opening having a desired orifice size, such as by a spinneret, as described herein. In some embodiments, the recycled PET may be comprised of a material that is not otherwise conducive for use in manufacturing PET bottles, or may comprise a PET material known to produce fibers possessing improvements in thermal performance over related art fibers.

In the embodiment illustrated in FIG. 1, a pump 116 supplies the polymer solution 112 to a spinneret 120. As described herein, the spinneret 120 generally comprises at least one orifice through which the polymer solution 112 is forced by way of centrifugal forces. An evaporation chamber 124 surrounded by a heating jacket 128 facilitates drawing the polymer into nanoscale fibers 132 and transitioning the nanofibers from a liquid state to a solid state. An air inlet 136 and an air outlet 140 facilitate cooling the nanoscale fibers 132 before they are deposited onto a collector 144 to form the PET nanofiber mat 108.

Figure 2:
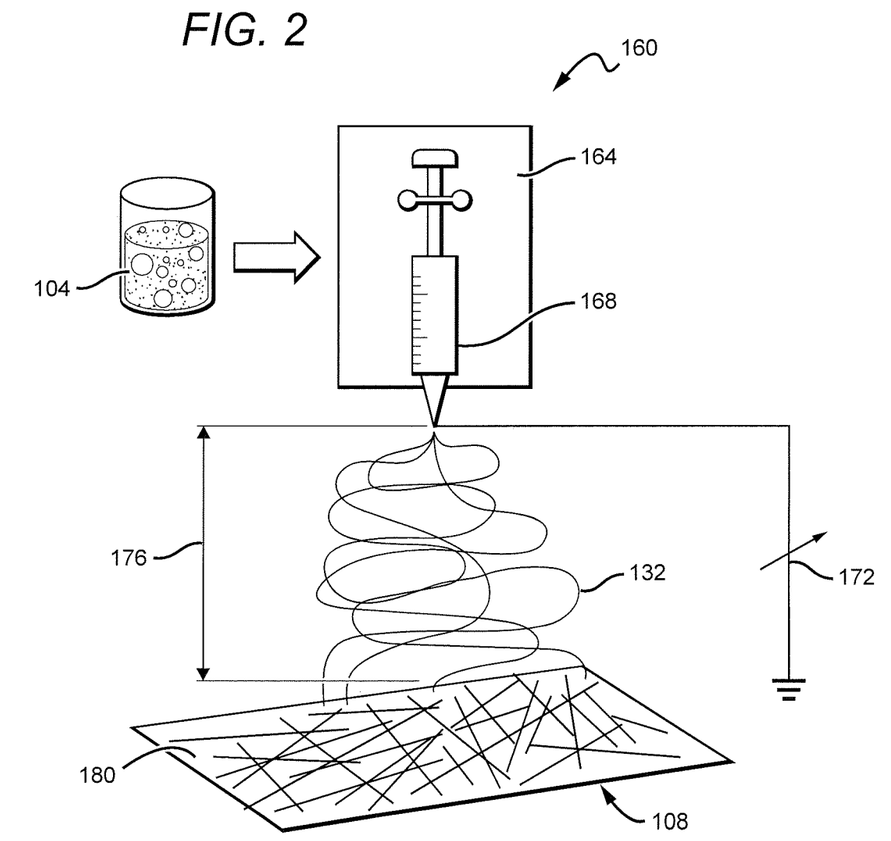
FIG. 2 is a schematic diagram illustrating an electrospinning system for fabricating nanofibers, in accordance with an embodiment of the present disclosure.

FIG. 2 is a schematic diagram illustrating an electro-spinning system 160 for fabricating nanofibers. Similar to the force-spinning system 100, the electro-spinning system 160 utilizes the precursor material 104 to fabricate the nanofiber mat 108. The precursor material 104 is used to create a polymer melt 164 that serves as a source material for the electro-spinning system 160. A melt injector 168 forces the polymer melt 164 through a suitably sized orifice, thereby forming nanofibers 132. A high voltage power supply 172 draws the nanofibers across a working distance 176 to a collector 180 where the nanofibers are deposited in the form of the nanofiber mat 108. In some embodiments, an evaporation chamber and/or a heating jacket may be incorporated into the electro-spinning system so as to transition the nanofibers 132 from the liquid state to the solid state. Further, in some embodiments air may be used for cooling the nanoscale fibers 132 before they are deposited onto the collector 180.

As will be appreciated, although the electro-spinning system 160 desirably produces fibers having diameters ranging between 5 nanometers (nm) and several micrometers, the electro-spinning system 160 is limited to only conductive polymers. Further, there are certain parameters that must be carefully controlled during fabricating the nanofibers 132, such as, for example, voltage applied across the working distance 176, flow rate through the melt injector 168, viscosity and conductivity of the polymer melt 164, as well as accounting for any defects that may be present within the precursor material 104. Unlike the electro-spinning system 160, however, the force-spinning system 100 uses centrifugal forces rather than electrostatic forces, and thus the force-spinning system 100 may be used with nonconductive polymer melts. As such, the force-spinning system 100 provides a greater flexibility for material selection than does the electro-spinning system 160.

Figure 3A:
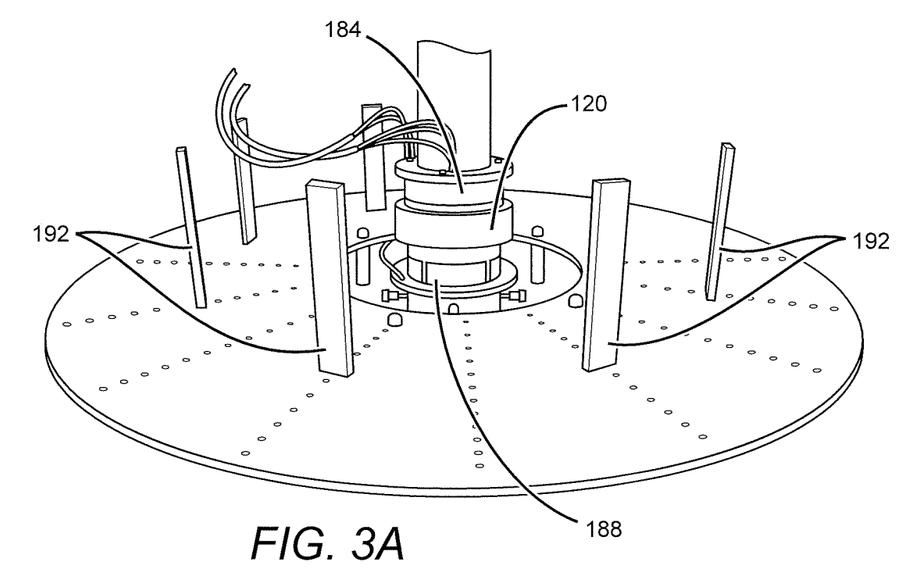
FIG. 3A is a perspective view illustrating an interior of the force-spinning system illustrated in FIG. 1 in accordance with present invention.
Figure 3B:
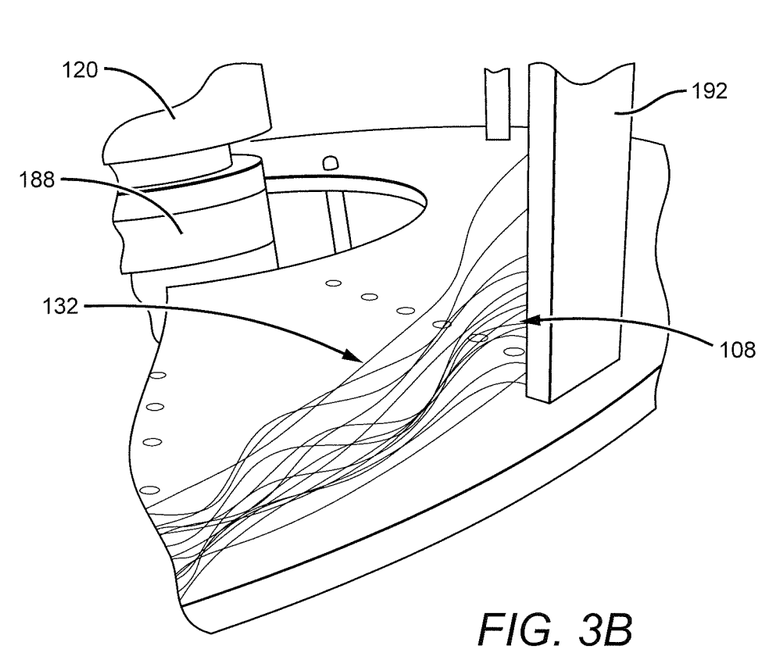
FIG. 3B is a perspective view illustrating exemplary fibers being produced by way of the force-spinning system illustrated in FIG. 3A, according to the present disclosure.

FIG. 3A is a perspective view illustrating an interior of the force-spinning system 100 illustrated in FIG. 1. As shown in FIG. 3A, a top heater 184 is disposed above the spinneret 120 and a bottom heater 188 is disposed below the spinneret 120. The heaters 184, 188 are configured to maintain a liquid temperature of the polymer solution 112 ranging between 180° C. and 340° C. A plurality of collectors 192 are circumferentially disposed around the spinneret 120. The collectors are configured to capture the nanoscale fibers 132 in the form of free-standing nanofiber mats 108, as shown in FIG. 3B.

Figure 4:
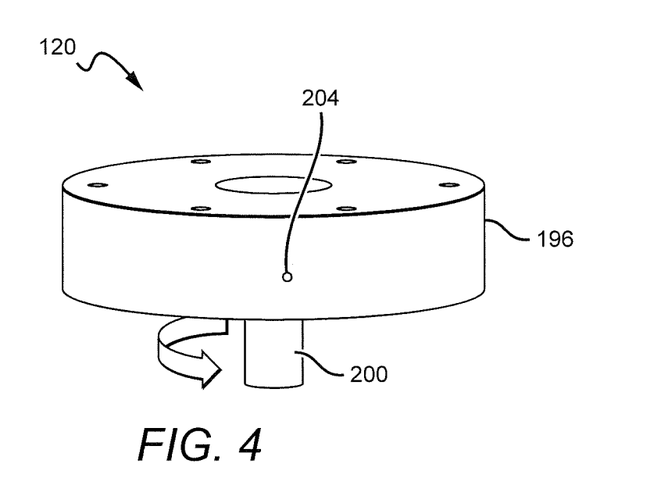
FIG. 4 is a schematic diagram illustrating a perspective view of a spinneret for fabricating nanofibers, in accordance with an embodiment of the present disclosure.

As shown in FIG. 4, the spinneret 120 generally is comprised of a cylindrical body 196 configured to rotate on an axle 200 so as to generate a sufficient level of centrifugal force to push the polymer solution 112 through one or more orifices 204. In the embodiment illustrated in FIGS. 3A through 3B, the force-spinning system 100 is configured to maintain a rotational speed of the spinneret 120 ranging between 12,000 RPM and 15,000 RPM. The orifices 204 generally have a size suitable for fabricating the nanoscale fibers 132.

Figure 5A:
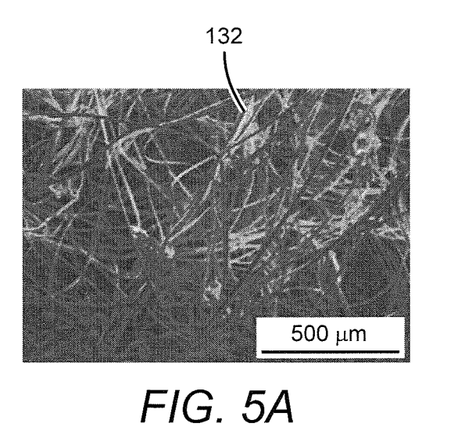
FIG. 5A is a scanning electron micrograph of PET nanofibers produced by way of the force-spinning system illustrated in FIG. 3A, in accordance with the present disclosure.
Figure 5B:
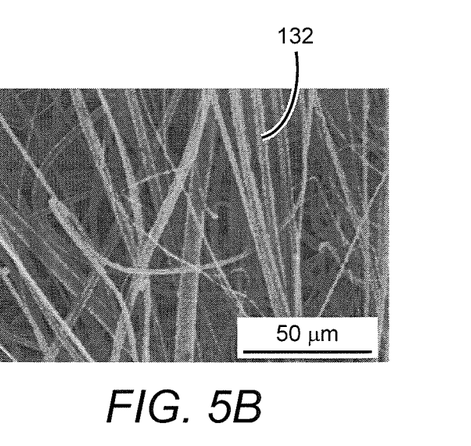
FIG. 5B is a scanning electron micrograph of PET nanofibers produced by way of the force-spinning system illustrated in FIG. 3A, in accordance with the present disclosure.
Figure 5C:
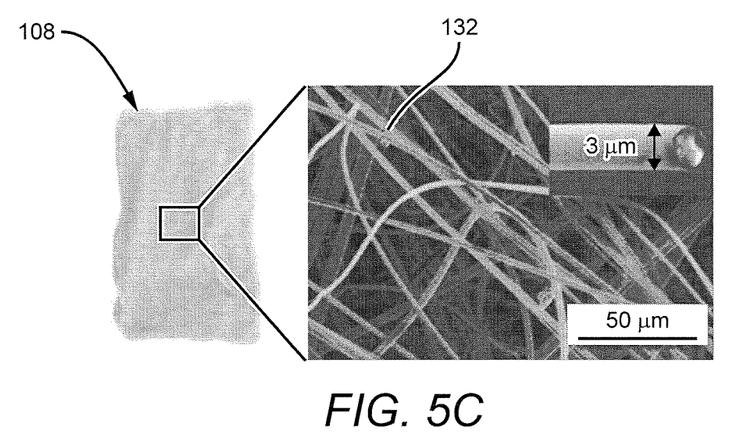
FIG. 5C is a scanning electron micrograph of PET nanofibers produced by way of the force-spinning system illustrated in FIG. 3A, in accordance with the present disclosure.

In one embodiment, the orifices 204 preferably have a size ranging between 20 gauge and 30 gauge. In some embodiments, a first portion of the orifices 204 may have a first size and a second portion of the orifices may have a second size so as to fabricate nanofiber mats comprising a mixture of fibers having different cross-sectional diameters, as shown in FIGS. 5A through 5C. In some embodiments, the first size may be relatively larger than the second size. In one exemplary embodiment, the spinneret 120 comprises 400 of the orifices 204, wherein for every 4 of the orifices 204 that are large, 10 of the orifices are smaller. Further, in one embodiment the large sized orifices 204 are configured to form relatively larger fibers having a diameter of approximately 12 microns, and the small sized orifices 204 are configured to form relatively smaller fibers with a diameter ranging between 0.5 microns and 7 microns. As will be appreciated, the larger fibers impart supportive properties to the PET nanofiber mat 108, thereby improving loft, whereas the smaller fibers simulate a feather behavior. The smaller fibers generally inhibit air movement within the nanofiber mat 108, thereby minimizing thermal conductivity of the mat.

Moreover, in some embodiments a first portion of the orifices 204 and a second portion of the orifices may have different structural features, wherein the first portion and the second portion comprise orifices of essentially the same size. In one exemplary embodiment, the first portion of the orifices 204 may comprise a recessed feature configured to form fibers having a diameter that is relatively larger the diameter of fibers formed by way of the second portion of the orifices without any such recessed feature.

Figure 6:
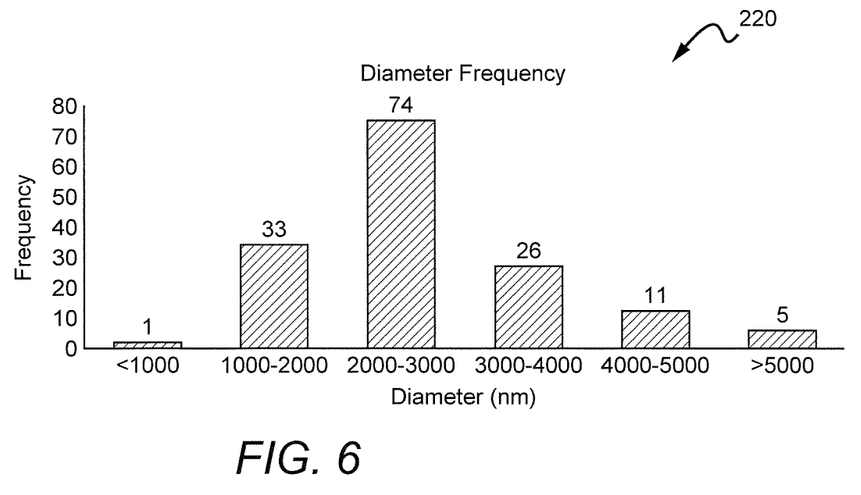
FIG. 6 is a histogram illustrating a nanofiber diameter distribution produced by way of the force-spinning system illustrated in FIG. 3A, according to the present disclosure.
Figure 7:
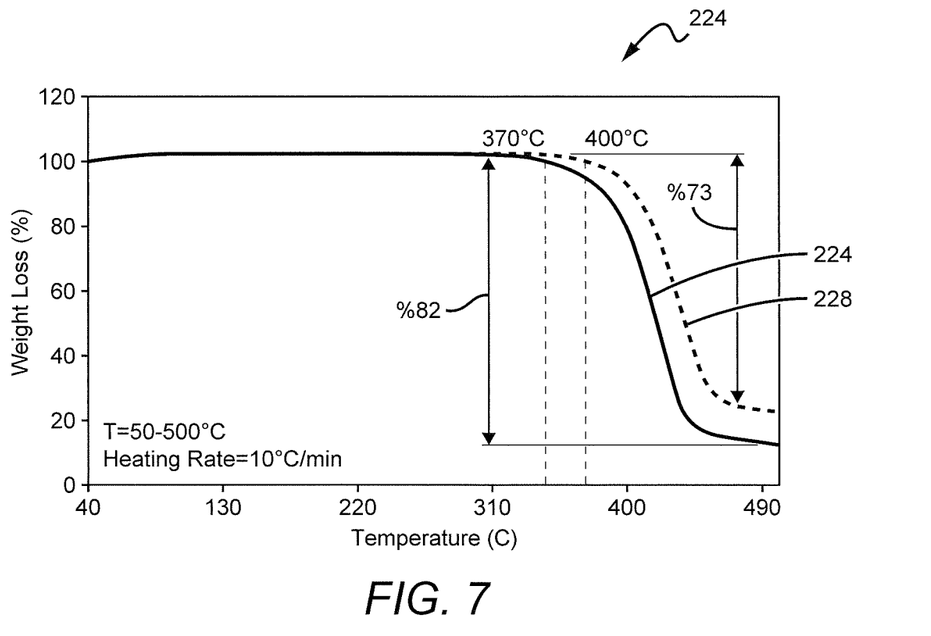
FIG. 7 is a graph illustrating thermogravimetric data as percent weight loss as a function of temperature for fabricated nanofibers, according to the present disclosure.
Figure 8:
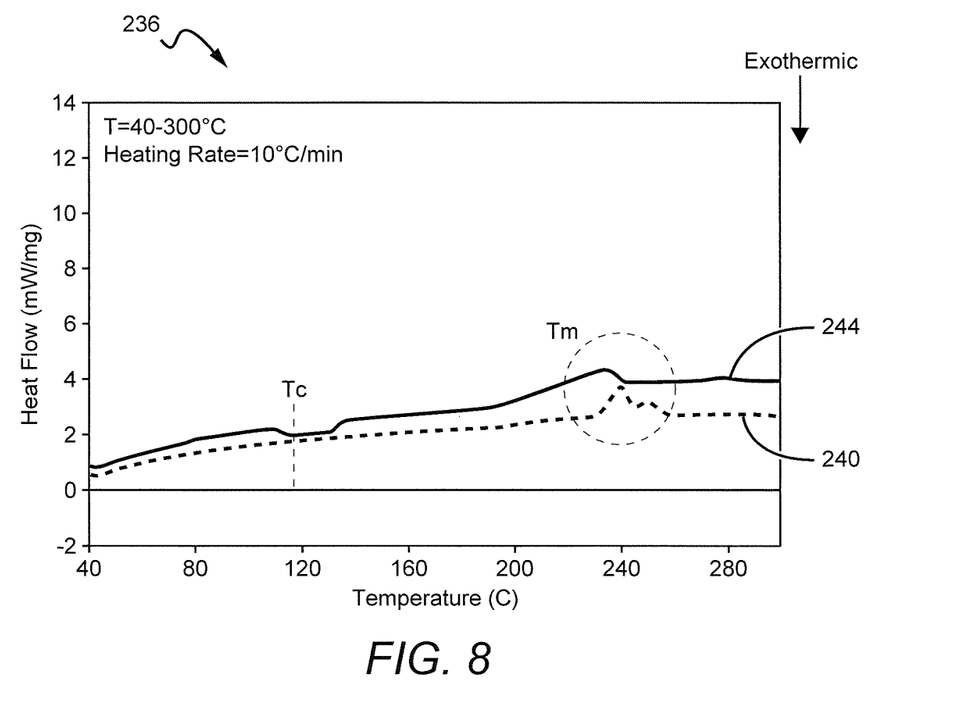
FIG. 8 is a graph illustrating differential scanning calorimetry data as heat flow as a function of temperature for nanofibers fabricated in accordance with the present disclosure.

FIGS. 6 through 8 illustrate various characterization of data obtained by way of the force-spinning system 100, illustrated in FIG. 3A. FIG. 6 is a histogram 220 illustrating a distribution of diameters of PET nanofibers produced by way of the force-spinning system 100. Nanofibers having a range of diameters were observed with diameters ranging between 2000 nm and 3000 nm being most frequently present. FIG. 7 is a graph 224 illustrating thermogravimetric data expressed in terms of percent weight loss as a function of temperature. Data for PET pellets are represented by a curve 228, and data for fabricated nanofibers in argon are represented by a curve 232. FIG. 8 is a graph 236 illustrating differential scanning calorimetry data expressed in terms of heat flow as a function of temperature. Data for PET pellets are represented by a curve 240, and data for fabricated nanofibers in argon are represented by a curve 244.

Figure 9:
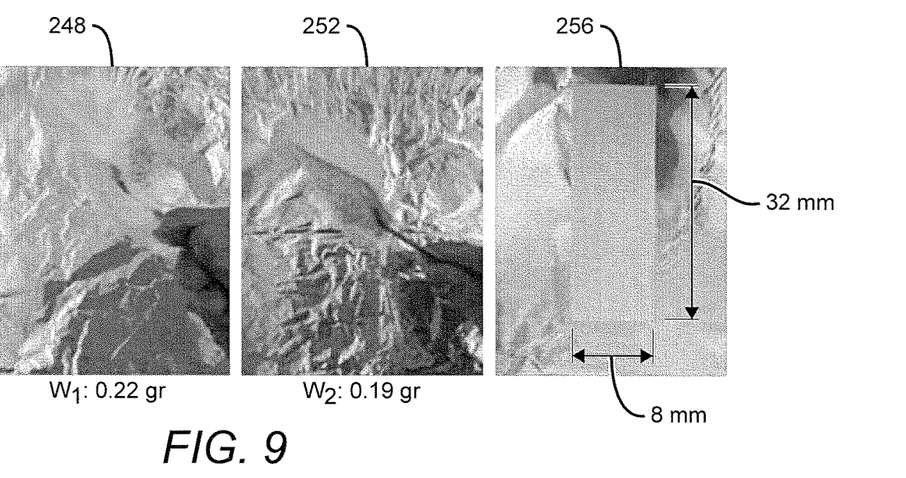
FIG. 9 is a group of micrographs illustrating dynamic mechanical analysis samples of fabricated nanomaterials, according to the present disclosure.
Figure 10:
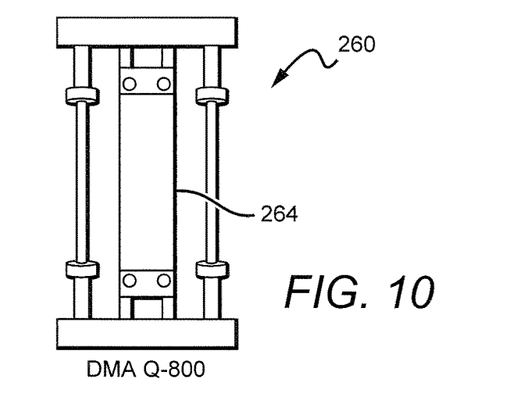
FIG. 10 is a schematic diagram illustrating a dynamic mechanical analysis apparatus for measuring tensile strength and temperature of a sample, according to the present disclosure.
Figure 11:
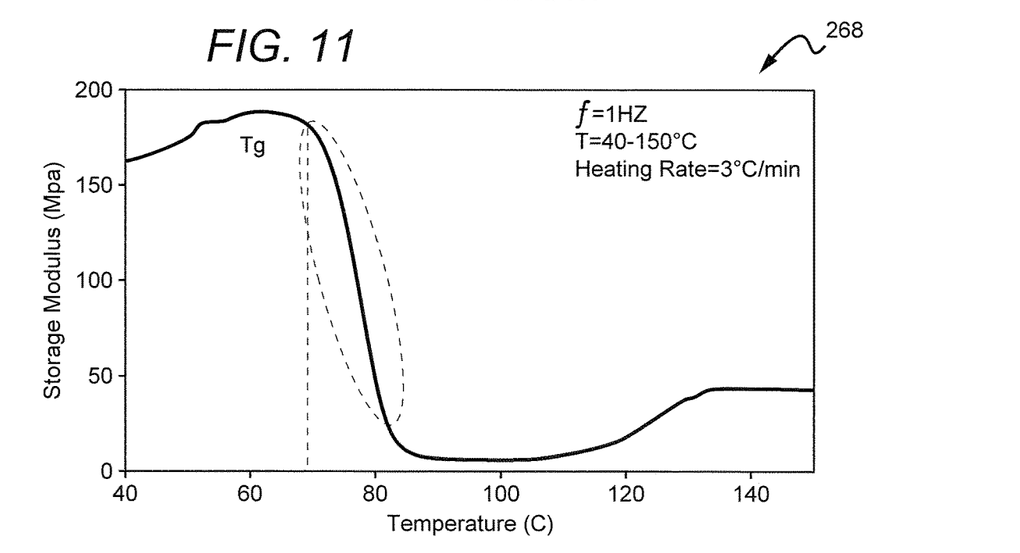
FIG. 11 is a graph illustrating dynamic mechanical analysis data obtained by way of the apparatus illustrated in FIG. 10 and a sample comprising a hot-pressed PET nanofiber mat fabricated in accordance with the present disclosure.

FIGS. 9 through 11 illustrate a dynamic mechanical analysis performed on the PET nanofiber mat 108. Micrographs illustrating samples of the PET nanofiber mat 108 tested are illustrated in FIG. 9. A first weight and a second weight of the PET nanofiber mat are respectively illustrated in micrographs 248, 252. Micrograph 256 shows an entirety of a PET nanofiber mat used for testing. An apparatus 260 for measuring tensile strength and temperature of the samples is illustrated in FIG. 10. An exemplary sample 264 is shown in a configuration within the apparatus 248 suitable for performing dynamic mechanical analysis. FIG. 11 is a graph 268 illustrating a relationship between storage modulus and temperature of hot-pressed PET nanofiber samples tested by way of the apparatus 248. As shown in FIG. 11, a relatively sharp decrease in storage modulus occurs in a temperature ranging between substantially 70° C. and 83° C.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method of fabricating a plurality of polyethylene terephthalate (PET) nanofibers having enhanced thermal and structural properties, the method comprising:

utilizing a precursor material to fabricate a nanofiber mat, thereby used to create a polymer melt that serves as a source material for a force-spinning system comprising a spinneret, wherein an evaporation chamber surrounded by a heating jacket is incorporated into the force-spinning system so as to transition nanofibers from the liquid state to a solid state, wherein a pump is configured to supply the source material to the force-spinning system, wherein the force-spinning system comprises top and bottom heaters configured to maintain a liquid temperature of the polymer melt ranging between 180° C. and 340° C., a plurality of collectors circumferentially disposed around the spinneret and configured to capture the nanofibers, the force-spinning system configured to maintain a rotational speed of the spinneret ranging between 12,000 and 15,000 RPM, wherein the nanofibers are drawn across a working distance to a collector using a high voltage power supply;

supplying a counter-current air flow to cool the nanofibers prior to being deposited on one of the plurality of collectors; and extruding and spinning a polymeric resin material through a plurality of orifices of an extruding apparatus, at least a portion of the plurality of orifices having at least one feature of a radial arrangement, a recessed portion, and a distinctive size in relation to a remaining portion of the plurality of orifices, wherein the portion of the plurality of orifices have a first diameter and the remaining portion of the plurality of orifices have a second diameter, the first diameter being configured to form nanofibers having a cross-sectional size of approximately 12 microns, and the second diameter being configured to form nanofibers having a cross-sectional size ranging between substantially 0.5 microns and substantially 7 microns, wherein about 88% of the plurality of PET nanofibers have a diameter between 1000 nm and 4000 nm and wherein about 10% of the plurality of PET nanofibers have a diameter greater than 4000 nm, and the nanofiber mat comprising a decrease in storage modulus between 70 and 83 degrees Celsius.

2. The method of claim 1, further comprising controlling a temperature of the polymeric resin material during extruding and spinning.

3. The method of claim 1, further comprising controlling a rotation speed of the extruding apparatus during extruding and spinning.

4. The method of claim 1, wherein extruding and spinning comprises providing an effective centripetal acceleration to the polymeric resin material that increases as a function of radial distance from a center of the extruding apparatus, thereby forming the portion of the plurality of fibers having a smaller cross-section in relation to the remaining portion of the plurality of fibers.

5. The method of claim 1, wherein the plurality of orifices have a diameter ranging between substantially 20 gauge and substantially 30 gauge.

6. A method of fabricating a plurality of polyethylene terephthalate (PET) nanofibers, the method comprising:

extruding and spinning a polymeric resin material through a plurality of radially arranged orifices of a spinneret apparatus, wherein the spinneret apparatus is spun at a rotational speed between 12,000 and 15,000 RPM, and wherein each orifice in a first portion of the plurality of orifices has a first diameter and each orifice in a remaining portion of the plurality of orifices has a second diameter, the second diameter being different from the first diameter;

supplying a counter-current air flow to cool fibers exiting the spinneret apparatus; and collecting PET nanofibers, wherein about 88% of the plurality of PET nanofibers have a diameter between 1000 nm and 4000 nm, a majority of which have a diameter between 2000 nm and 3000 nm; wherein about 10% of the plurality of PET nanofibers have a diameter greater than 4000 nm.

7. The method according to claim 6, wherein each orifice in the plurality of orifices has a diameter ranging between 20 gauge and 30 gauge.

8. The method according to claim 7, wherein the polymeric resin material comprises recycled PET.

* * * * *